(12) United States Patent
Wiplinger

(10) Patent No.: US 12,528,580 B2
(45) Date of Patent: Jan. 20, 2026

(54) FIREFIGHTING FLOAT PLANE WITH ASYMMETRIC SCOOP DEPLOYMENT MITIGATION

(71) Applicant: Wipaire, Inc., South St. Paul, MN (US)

(72) Inventor: Charles R. Wiplinger, Inver Grove Heights, MN (US)

(73) Assignee: Wipaire, Inc., South St. Paul, MN (US)

( * ) Notice: Subject to any disclaimer, the term of this patent is extended or adjusted under 35 U.S.C. 154(b) by 0 days.

(21) Appl. No.: 18/776,045

(22) Filed: Jul. 17, 2024

(65) Prior Publication Data

US 2025/0026473 A1 Jan. 23, 2025

Related U.S. Application Data

(60) Provisional application No. 63/514,996, filed on Jul. 21, 2023.

(51) Int. Cl.
| | | |
|---|---|---|
| *B64C 35/00* | (2006.01) | |
| *A62C 3/02* | (2006.01) | |
| *B64C 25/54* | (2006.01) | |
| *B64D 1/16* | (2006.01) | |
| *B64D 45/00* | (2006.01) | |

(52) U.S. Cl.
CPC .......... *B64C 35/001* (2013.01); *A62C 3/0235* (2013.01); *B64C 25/54* (2013.01); *B64D 1/16* (2013.01); *B64D 45/00* (2013.01)

(58) Field of Classification Search
CPC ..... B64C 35/001; B64C 25/54; A62C 3/0235; A62C 3/0228; B64D 1/16
See application file for complete search history.

(56) References Cited

U.S. PATENT DOCUMENTS

| | | |
|---|---|---|
| 1,373,408 A | 4/1921 | Starling |
| 1,603,304 A | 10/1926 | Zimmermann |
| 1,722,467 A | 7/1929 | Huff |
| 1,765,328 A | 6/1930 | Fokker et al. |
| 1,765,329 A | 6/1930 | Fokker et al. |
| 1,790,988 A | 2/1931 | Lalli |
| 1,858,762 A | 5/1932 | Bellanca |
| 1,911,431 A | 5/1933 | Cawley |
| 1,995,089 A | 3/1935 | Bellanca |

(Continued)

FOREIGN PATENT DOCUMENTS

| | | |
|---|---|---|
| CA | 1189496 A1 | 6/1985 |
| CA | 3134089 A1 | 10/2020 |

(Continued)

OTHER PUBLICATIONS

International Searching Authority "International Search Report and Written Opinion" From Application No. PCT/US2024/038413, Mailed Oct. 23, 2024, pp. 16.

(Continued)

*Primary Examiner* — Nicholas McFall
*Assistant Examiner* — Justin Michael Heston
(74) *Attorney, Agent, or Firm* — Fredrikson & Byron, P.A.

(57) ABSTRACT

A firefighting float plane having a fuselage, one or more wings, two floats, a water scoop associated with each float for filling a water tank of the firefighting float plane, and systems and/or methods for deploying the water scoops to prevent (and/or mitigate the effects of) asymmetric deployment and/or retraction of the water scoops.

33 Claims, 8 Drawing Sheets

(56) References Cited

U.S. PATENT DOCUMENTS

| | | | |
|---|---|---|---|
| D115,854 S | 7/1939 | Loudy | |
| 2,359,652 A | 10/1944 | Larsen | |
| 2,379,355 A | 6/1945 | Hodgdon | |
| 2,534,722 A | 12/1950 | Meiklejohn, Jr. et al. | |
| 2,665,092 A | 1/1954 | Sands | |
| 2,699,299 A | 1/1955 | Herrick | |
| 2,958,486 A | 11/1960 | Bloomfield et al. | |
| D198,346 S | 6/1964 | Ahrens | |
| 3,289,415 A | 12/1966 | Merrill | |
| 3,423,053 A * | 1/1969 | Hawkshaw | B64D 1/16 116/215 |
| 3,442,334 A | 5/1969 | Spero | |
| 3,661,211 A | 5/1972 | Powers | |
| 3,754,601 A | 8/1973 | Linkewich | |
| 3,897,829 A | 8/1975 | Eason | |
| 3,901,467 A | 8/1975 | Hawkshaw | |
| 4,090,567 A | 5/1978 | Tomlinson | |
| 4,165,059 A | 8/1979 | Summer | |
| 4,172,499 A | 10/1979 | Bernstein et al. | |
| 4,298,175 A | 11/1981 | Earl | |
| D273,005 S | 3/1984 | McComas | |
| 4,474,350 A | 10/1984 | Hawkshaw | |
| 4,645,143 A | 2/1987 | Coffy | |
| D303,950 S | 10/1989 | Burgess | |
| 4,962,978 A | 10/1990 | Weston | |
| D319,805 S | 9/1991 | Wiegert | |
| 5,065,958 A | 11/1991 | Stubstad et al. | |
| 5,224,669 A | 7/1993 | Guimbal | |
| 5,320,306 A | 6/1994 | Gennaro | |
| 5,462,242 A | 10/1995 | Collins et al. | |
| 5,549,259 A | 8/1996 | Herlik | |
| D381,952 S | 8/1997 | Carter, Jr. | |
| 5,782,427 A | 7/1998 | Hermach | |
| 5,967,462 A | 10/1999 | Foster et al. | |
| 6,113,028 A | 9/2000 | Lohse et al. | |
| 6,192,990 B1 | 2/2001 | Brooke | |
| 6,209,593 B1 | 4/2001 | Nichols | |
| 6,244,538 B1 | 6/2001 | Howard et al. | |
| D446,182 S | 8/2001 | Adam et al. | |
| 6,367,738 B1 | 4/2002 | Wadleigh | |
| 6,405,980 B1 | 6/2002 | Carter | |
| 6,427,942 B2 | 8/2002 | Howard et al. | |
| 6,644,595 B2 | 11/2003 | Ramage et al. | |
| 6,688,402 B1 | 2/2004 | Wise | |
| 6,874,734 B2 | 4/2005 | Ramage et al. | |
| 6,927,702 B2 | 8/2005 | Wiplinger | |
| D543,248 S | 5/2007 | Winston | |
| D559,329 S | 1/2008 | Connally et al. | |
| 7,322,872 B2 | 1/2008 | Butler et al. | |
| 7,552,895 B2 | 6/2009 | From | |
| 7,690,600 B2 | 4/2010 | Olive et al. | |
| D620,838 S | 8/2010 | Miralles et al. | |
| 7,918,417 B2 | 4/2011 | Mouille | |
| 8,763,997 B2 | 7/2014 | Dunn | |
| 8,919,694 B2 | 12/2014 | Amante et al. | |
| 8,979,024 B2 | 3/2015 | Piccone et al. | |
| 8,998,134 B2 | 4/2015 | Fews et al. | |
| 9,085,361 B2 | 7/2015 | Prud'Homme-Lacroix | |
| D743,868 S | 11/2015 | Cummings et al. | |
| 9,327,149 B2 | 5/2016 | Lemke et al. | |
| 9,840,326 B2 | 12/2017 | Stupakis | |
| 9,908,622 B2 | 3/2018 | Doten | |
| 9,957,047 B2 | 5/2018 | Benedik | |
| 10,146,186 B2 | 12/2018 | Yamamoto et al. | |
| 10,195,471 B2 | 2/2019 | Doten | |
| D843,919 S | 3/2019 | Tzarnotzky et al. | |
| D856,898 S | 8/2019 | Evulet | |
| D856,899 S | 8/2019 | Evulet et al. | |
| D865,636 S | 11/2019 | Reichert et al. | |
| D868,668 S | 12/2019 | Parvizian et al. | |
| D872,681 S | 1/2020 | Tzarnotzky et al. | |
| D873,200 S | 1/2020 | Langford, III et al. | |
| D873,201 S | 1/2020 | Langford, III et al. | |
| D875,022 S | 2/2020 | Cummings | |
| D880,401 S | 4/2020 | Mombrinie | |
| D881,788 S | 4/2020 | Tian | |
| 11,123,587 B2 | 9/2021 | Schnarr et al. | |
| 11,208,210 B2 | 12/2021 | Wiplinger | |
| 2002/0084383 A1 | 7/2002 | Maeda | |
| 2002/0125016 A1 | 9/2002 | Cofield | |
| 2003/0146005 A1 | 8/2003 | Brooke et al. | |
| 2006/0289697 A1 | 12/2006 | Clark | |
| 2007/0164162 A1 | 7/2007 | Olive et al. | |
| 2009/0126951 A1 | 5/2009 | Baek | |
| 2010/0178176 A1 | 7/2010 | Kenyon et al. | |
| 2011/0036939 A1 | 2/2011 | Easter | |
| 2011/0192617 A1 | 8/2011 | Saurina Casals | |
| 2011/0248118 A1 | 10/2011 | Meekins et al. | |
| 2014/0158815 A1 | 6/2014 | Renteria | |
| 2014/0158816 A1 | 6/2014 | Delorean | |
| 2016/0279451 A1 | 9/2016 | Doten | |
| 2017/0072236 A1 | 3/2017 | Cordani et al. | |
| 2017/0080267 A1 | 3/2017 | Wagner et al. | |
| 2017/0267368 A1 | 9/2017 | Hara et al. | |
| 2018/0297705 A1 | 10/2018 | Coulson et al. | |
| 2019/0168873 A1 | 6/2019 | Wiplinger | |
| 2021/0171192 A1 | 6/2021 | Willford | |
| 2021/0198934 A1 | 7/2021 | Trotter | |
| 2022/0204156 A1 | 6/2022 | Pajus | |

FOREIGN PATENT DOCUMENTS

| | | | |
|---|---|---|---|
| CN | 105771115 A | 7/2016 | |
| CN | 115384771 A | 11/2022 | |
| EP | 3138772 A1 | 3/2017 | |
| FR | 1481100 A | 5/1967 | |
| FR | 2512775 A1 | 3/1983 | |
| GB | 2163710 A | 3/1986 | |
| RU | 2101216 C1 | 1/1998 | |
| RU | 2174934 C2 | 10/2001 | |
| RU | 2268765 C1 | 1/2006 | |
| RU | 2294301 C1 | 2/2007 | |
| WO | 2010028538 A1 | 3/2010 | |
| WO | 2016113256 A1 | 7/2016 | |
| WO | 2018165699 A1 | 9/2018 | |
| WO | 2020214081 A1 | 10/2020 | |

OTHER PUBLICATIONS

Adam A500, Wikipedia, Retrieved online from: <https://web.archive.org/web/20161005081942/https://en.wikipedia.org/wiki/Adam_A500> on Mar. 18, 2018, dated Oct. 5, 2016, 4 pages.

Ampaire's Electric EEL Skymaster Makes Longest Flight Yet by Curt Epstein, dated Oct. 12, 2020, https://www.ainonline.com/aviation-news/business-aviation/2020-10-12/arnpaires-electric-eelskyrnaster-makes-longest-flight-yet.

Big Boys Toys UAE Arrow Gyrocopter YouTube reference by Big Boys Toys Global, dated Oct. 12, 2016, https://www.youtube.com/watch?v=7wikfnwvdY4.

Cessna 337 Portugal by WS-Clave, Retrieved online from <https://ws-clave.deviantart.com/art/Cessna-337-Portugal-450887310>, originally submitted on Apr. 29, 2014, 2 pages.

Cessna 337 Skymaster Compilation YouTube. by TheHDAviation. dated Jun. 19, 2017. found online: [Dec. 18, 2020] https://www.youtube.com/watch?v=8WoHx19z6-Y.

Cessna O-2 Skymaster flying display at Sanicole Airshow 2015 by MUC-Spotter. dated Mar. 29, 2016, https://www.youtube.com/watch?v=vOiazjlb-3c.

Cessna Skymaster, Wikipedia, Retrieved online from <https://web.archive.org/web/20161129212525/https://en.wikipedia.org/wiki/Cessna_Skymaster> on Mar. 18, 2018, dated Nov. 29, 2016, 6 pages.

Dornier Seastar, Wikipedia, Retrieved online from <https://web.archive.org/web/20161017180310/https://en.wikipedia.org/wiki/Dornier_Seastar> on Mar. 18, 2018, dated Oct. 17, 2016, 3 pages.

Fire Boss LLC, About Us, Retrieved online from <https://web.archive.org/web/20161101162619/http://www.firebossllc.com:80/about.php> on Mar. 18, 2018, dated Nov. 1, 2016, 2 pages.

Fire Boss LLC, Gallery, Retrieved online from <https://web.archive.org/web/20161101162717/http://firebossllc.com/gallery.php> on Mar. 18, 2018, dated Nov. 1, 2016, 1 page.

(56) References Cited

OTHER PUBLICATIONS

Fire Boss LLC, Homepage, Retrieved online from <https://web.archive.org/web/20161202224642/http://www.firebossllc.com> on Mar. 18, 2018, dated Dec. 2, 2016, 1 page.
Fire Boss LLC, Index, Retrieved online from <https://web.archive.org/web/20161101162726/http://firebossllc.com/index.php> on Mar. 18, 2018, dated Nov. 1, 2016, 1 page.
Fire Boss LLC, Specifications, Retrieved online from <https://web.archive.org/web/20161101163115/http://firebossllc.com/specs.php> on Mar. 18, 2018, dated Nov. 1, 2016, 3 pages.
Howarth, "End of the line for CL-415 water-bombers?", Aviation Week Network, Retrieved online from <http://aviationweek.com/blog/end-line-cl-415-water-bombers>, Jun. 12, 2013, 2 pages.
Personal Airline Exchange Orders 50 Ampaire EEL Hybrid Electric Commuter Airplanes. by Nicolas Zart. dated Jun. 22, 2019. Found online [Dec. 18, 2020] https://cleantechnica.com/2019/06/22/persona••airline-exchange-orders-50-ampaire-eel-hybrid-electric-commuter•airplanes/.

\* cited by examiner

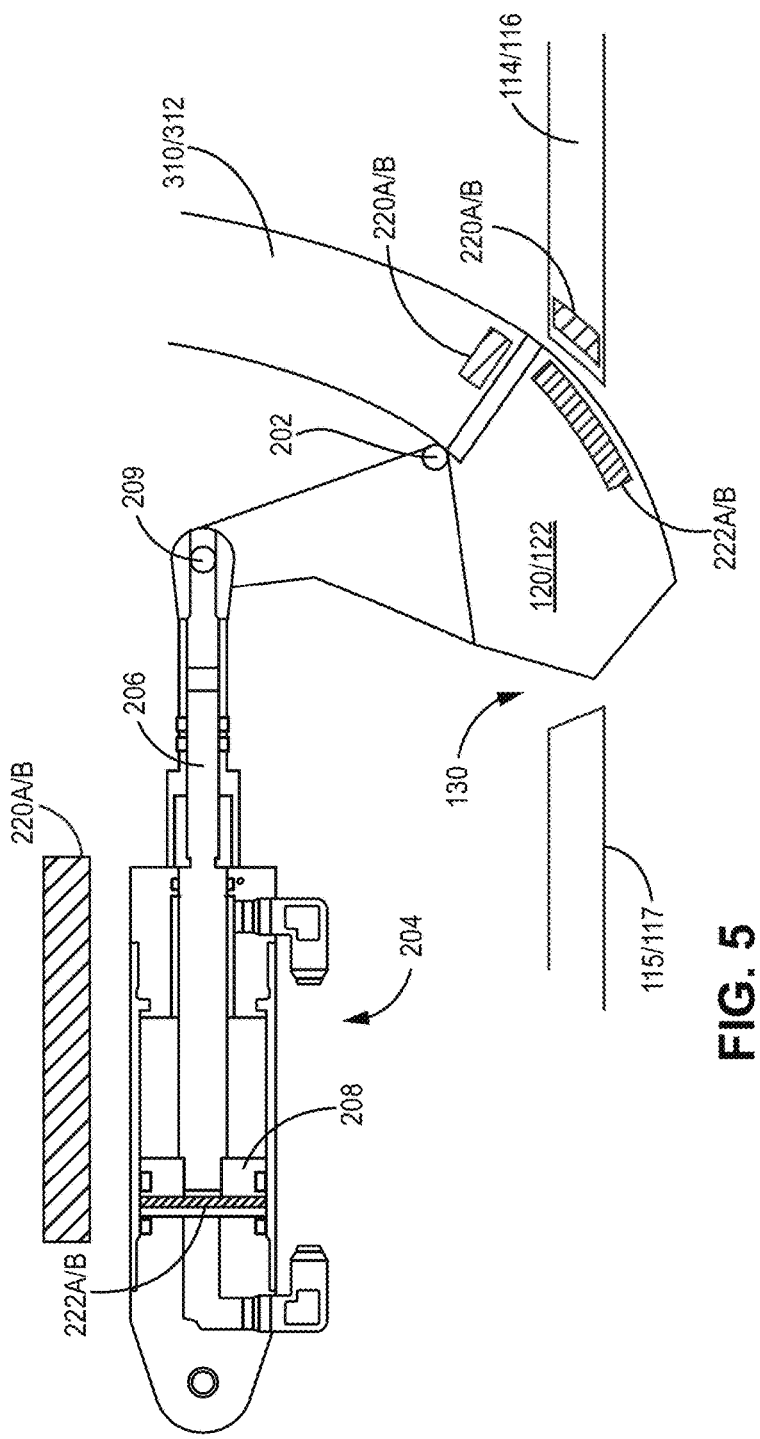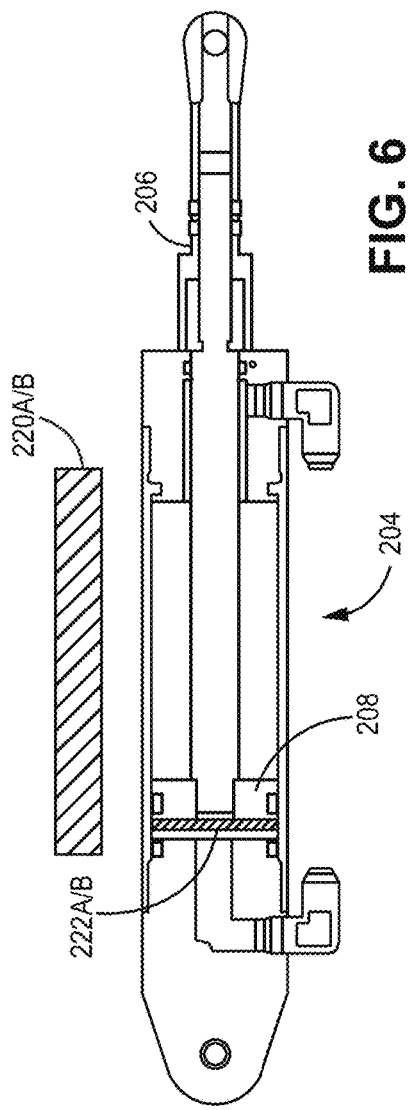
FIG. 5
FIG. 6 ions of the disclosure. Any statement in the present disclosure that a certain element, feature or characteristic "may" be included should be taken to mean that, in some embodiments, or in some aspects, such element, feature, or characteristic is included, and in other embodiments, or other aspects, such element, feature, or characteristic is excluded.

FIREFIGHTING FLOAT PLANE WITH ASYMMETRIC SCOOP DEPLOYMENT MITIGATION

CROSS-REFERENCE TO RELATED APPLICATIONS

This application claims priority to U.S. Provisional Patent Application No. 63/514,996, filed Jul. 21, 2023, the contents of which are incorporated herein by reference in their entirety.

TECHNICAL FIELD

The present invention relates to a float plane. More specifically, the invention provides a firefighting float plane having a fuselage, a wing, two floats, and a water scoop associated with each float for filling a water tank of the firefighting float plane.

BACKGROUND OF THE INVENTION

A float plane is a seaplane provided with a pair of pontoons, known as floats. The floats commonly are connected to the fuselage of the plane. The floats are configured to provide buoyancy on water, such that the float plane can takeoff from, and land on, the surface of a lake, river, ocean, or other body of water.

A firefighting float plane may have two floats, and each float may have an associated water scoop used to scoop water to be used during firefighting operations. The water scooping may occur while flying along (e.g., skimming) the surface of a body of water in order to replenish the supply of water in a water tank. A system for deploying and retracting the water scoops to and from the respective floats may be activated by a pilot or an operator in the aircraft. It would be desirable to prevent or manage any situation where the scoops do not deploy symmetrically. For example, it would be desirable to prevent or manage the following: one water scoop not fully deploying, or not deploying at all, or a pair of scoops deploying or retracting "asymmetrically." It would also be desirable to eliminate concern or perception that asymmetrical water scoop deployment or retraction may occur.

As set forth in the present disclosure, it would be desirable to provide a float plane having a system for scooping water that can be used to fill a water tank on the aircraft while preventing and/or managing asymmetric deployment and/or retraction of the water scoops.

SUMMARY OF THE INVENTION

Certain embodiments of the invention provide a firefighting float plane that includes a fuselage, a wing (e.g., two wings), a water tank, first and second floats, and first and second water scoops associated with the first and second floats, respectively. A firefighting float plane according to this disclosure may further include a scoop management system, and the first and second floats may be equipped respectively with the first and second water scoops. Each of the first and second water scoops may have a retracted position and an extended position, and the active scoop management system may be configured to (i) detect an asymmetrical deployment situation or condition of the first and second water scoops, and in response thereto (ii) initiate a safety response, which may include a safety response movement of one or both of the first and second water scoops to address and/or resolve the asymmetrical deployment situation.

Some embodiments of this disclosure include a method of operating water scoops and/or a water scoop system for a firefighting float plane. The firefighting float plane includes a fuselage, a wing (e.g., two wings), a water tank structure, first and second floats, and a water scoop system. The water scoop system includes a first water scoop associated with the first float and a second water scoop associated with the second float. Each of the first and second water scoops may be movable between a retracted position and an extended position. The method may include (a) detecting an asymmetric deployment condition of the first and second water scoops, and (b) in response to detecting an asymmetric deployment condition, initiating a safety response, which may include a safety response movement of one or both of the first and second water scoops.

BRIEF DESCRIPTION OF DRAWINGS

FIG. 5 is a schematic side view showing an example of a water scoop actuation mechanism for extending and/or retracting a water scoop with position sensors and associated sensing technologies disposed thereon in accordance with some embodiments of the present disclosure;

FIG. 6 is an enlarged cross-sectional side view of a portion of the water scoop actuation mechanism of FIG. 5 showing an example of a location for sensing technology;

DETAILED DESCRIPTION

Figure 1:
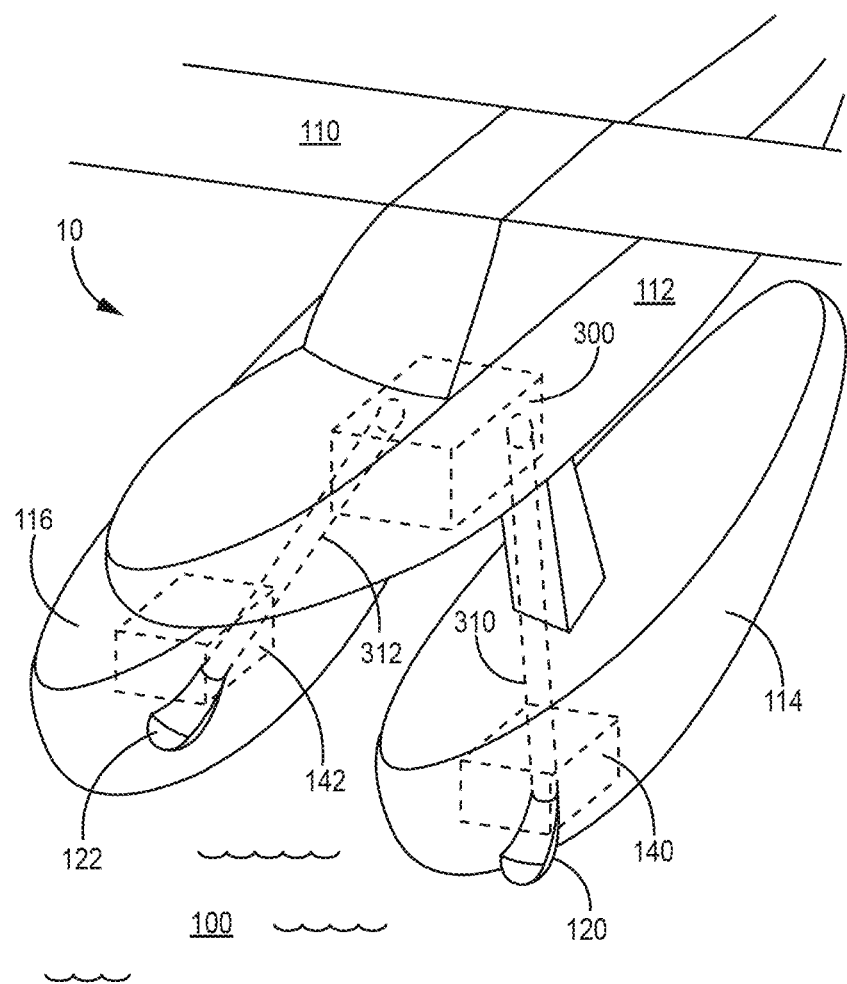
FIG. 1 is a partially broken-away schematic perspective view of a firefighting float plane in accordance with some embodiments of the present disclosure, showing first and second water scoops in an extended position from respective first and second floats.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

A float plane is a type of seaplane provided with a pair of pontoons, also known as floats. The pair of floats is typically connected to the fuselage of the plane. The floats are configured to provide buoyancy on water, such that the float plane can takeoff from, and land on, the surface of a body of water, such as a lake, river, ocean, or other body of water.

A firefighting float plane may have two floats (e.g., a right float and a left float), and each float may have an associated water scoop that can be used to scoop water from a body of water during flight. The scooped water can be retained in a water tank located on the firefighting float plane, until it is desired to release or deploy all or a portion of the water from the water tank during firefighting operations. This process can be repeated, as needed.

FIG. 1 shows an exemplary firefighting float plane 10 having a fuselage 112, a wing (e.g., two wings) 110, and a pair of floats 114, 116. The pair of floats may be referred to individually herein as a first float (or left or "port" float) 114 and a second float (or right or "starboard" float) 116. (The right and left designations are as viewed from a pilot's perspective within the float plane, as is conventional.) Each of the floats 114, 116 of the firefighting float plane 10 depicted in FIG. 1 has an associated water scoop 120, 122, which may be referred to individually herein as a first water scoop (or left or "port" water scoop) 120 and a second water scoop (or right or "starboard" water scoop) 122.

The water scoops 120, 122 are both shown in an extended position in FIG. 1. That is, both of the water scoops 120, 122 in FIG. 1 have been fully extended (or fully deployed) to a position below the lower contour or lower surface of the respective floats 114, 116. Here, each extended water scoop projects downwardly beyond the adjacent bottom surface of the respective float. This may be done, for example, in preparation for scooping water from a body of water 100. The water scoops 120, 122 are moveable between the extended position and a retracted position (not shown in FIG. 1) in which each of the water scoops 120, 122 is positioned substantially (or entirely) within the respective float 114, 116. The retracted position of the water scoops 120, 122 may be the "normal" or "default" position of the scoops while flying and/or during taking off and landing from a body of water, and the extended position of the water scoops 120, 122 may be used just prior to and/or during the water scooping. After water has been scooped, the water scoops 120, 122 are typically moved to the retracted position to resume normal operations.

The scooping of water from a body of water 100 may occur while flying the firefighting float plane 10 along (e.g., skimming) the surface of a body of water 100 in order to replenish the supply of water in a water tank 300 located in the firefighting float plane 10. Water tank 300 may be disposed within the fuselage 112 of plane 10, for example, as depicted schematically in FIG. 1. Various non-limiting water tank configurations are disclosed in U.S. Pat. No. 11,208,210, the salient teachings of which are incorporated herein by reference. When in the extended configuration, the water scoops 120, 122 can be lowered into a body of water by flying the float plane 10 along the water surface, e.g., by having the first float 114 and second float 116 skim across the water surface. While the float plane 10 flies along the water in this manner (with the floats 114, 116 skimming across the surface of the body of water 100), the water scoops 120, 122 "scoop up" water. Water retrieved by the water scoops 120, 122 in this manner flows upwardly into the water tank 300.

FIG. 1 also shows a pair of scoop tubes 310, 312 configured to deliver the water obtained by (and/or received from) the water scoops 120, 122 to the water tank 300. It should be noted that the schematic arrangement of scoop tubes 310, 312 shown in FIG. 1 is by way of example only and is not meant to be limiting in any way. Other configurations are contemplated for delivering the water that is obtained by the water scoops 120, 122 to the water tank 300 via pipes or tubes such as scoop tubes 310, 312, including Y-connections and/or curved or angled portions, etc. An advantageous example is the system currently used on the Fire Boss aircraft, which is commercially available from Fire Boss LLC (South Saint Paul, Minnesota, U.S.A.).

Figure 2A:
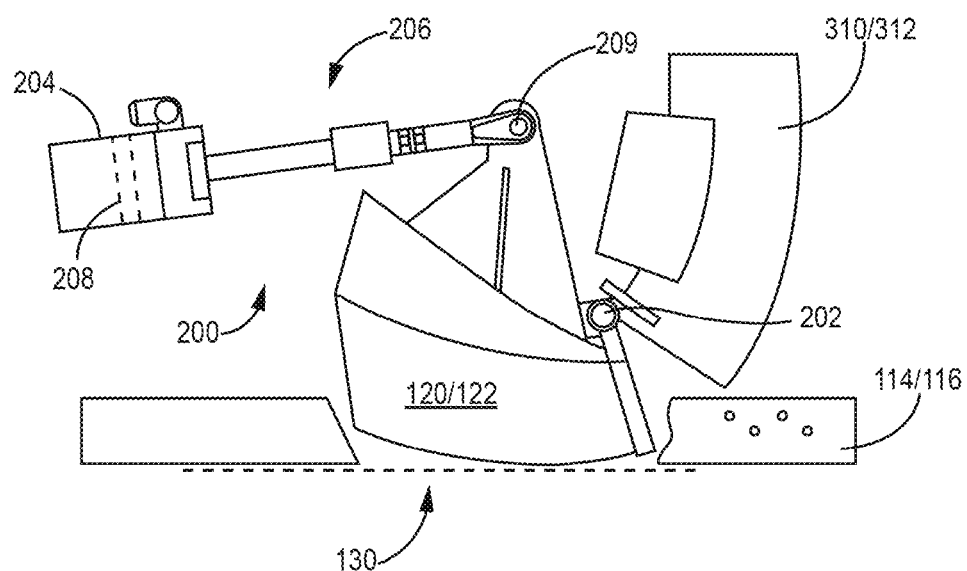
FIGS. 2A and 2B are schematic side views showing an example of a water scoop actuation mechanism for extending and/or retracting a water scoop from its associated float, with FIG. 2A showing the water scoop in a retracted position and FIG. 2B showing the water scoop in an extended position, in accordance with some embodiments of the present disclosure.
Figure 2B:
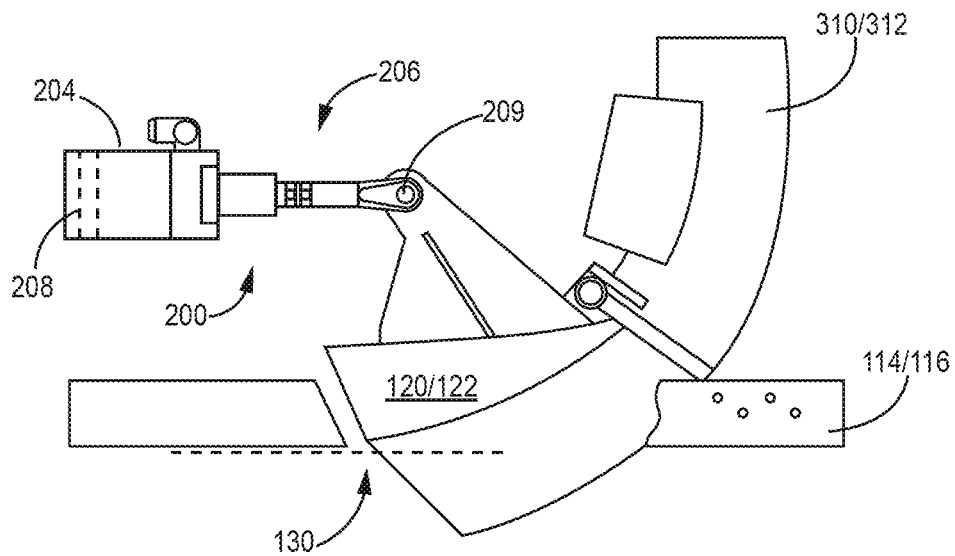

FIGS. 2A and 2B show an exemplary water scoop actuation mechanism 200 for extending and retracting either of the water scoops 120, 122. As depicted, an opening 130 may be formed in a lower portion of each of the floats 114, 116 to enable the water scoops 120, 122 to extend from and retract into their respective floats 114, 116. Only one such mechanism 200 is shown in FIGS. 2A and 2B, although it is to be understood that a pair of water scoop actuation mechanisms 200 (or 200A and 200B) will typically be used, one corresponding to each of the water scoops 120, 122. In the embodiment depicted in FIGS. 2A and 2B, a water scoop 120/122 can be moved from a retracted position (as shown in FIG. 2A) to an extended position (as shown in FIG. 2B) by causing the water scoop 120/122 to pivot, e.g., about a hinged coupling 202. Hinged coupling 202 may be disposed at a distal end region of a scoop tube 310, 312 in some embodiments. The first and second water scoops 120, 122 may accordingly be placed in fluid communication with the water tank 300 via scoop tubes 310, 312 and/or related tubing, which may extend from the first and second water scoops 120, 122, through the first and second floats 114, 116, and to the water tank 300. Pivoting movement of the water scoop 120/122 may be initiated by linear motion of a linkage 206, which may be pivotably coupled to a portion 209 of the water scoop 120/122. This can be done, for example, in the manner shown in FIGS. 2A and 2B. The motive force for moving linkage 206 may be an actuator 204, such as a hydraulic or pneumatic actuator having a piston 208. Alternatively, the motive force for moving linkage 206 may be an actuator 204 comprising one or more electric motors. Other technologies may also be suitable for the actuator 204 in that they would supply the requisite amount of force to move linkage 206 linearly in both directions (e.g., in a reciprocating manner) to thereby cause the water scoops 120/122 to pivot about the hinged coupling 202, and to thereby move the water scoops 120/122 from the retracted position to the extended position, and from the extended position to the retracted position.

Figure 3A:
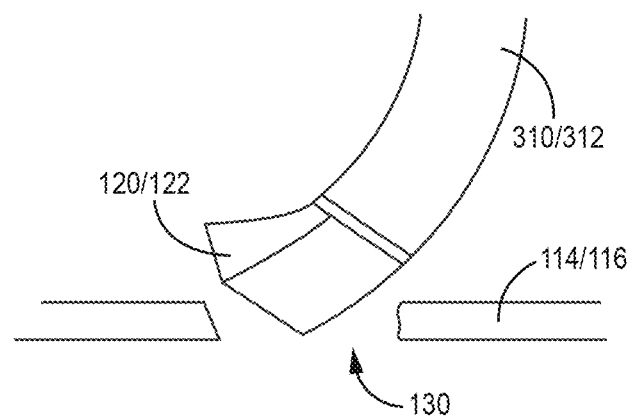
FIGS. 3A and 3B are schematic side views showing an example of an alternate water scoop actuation mechanism for extending and/or retracting a water scoop from its associated float, with FIG. 3A showing the water scoop in a retracted position and FIG. 3B showing the water scoop in an extended position, in accordance with some embodiments of the present disclosure.
Figure 3B:
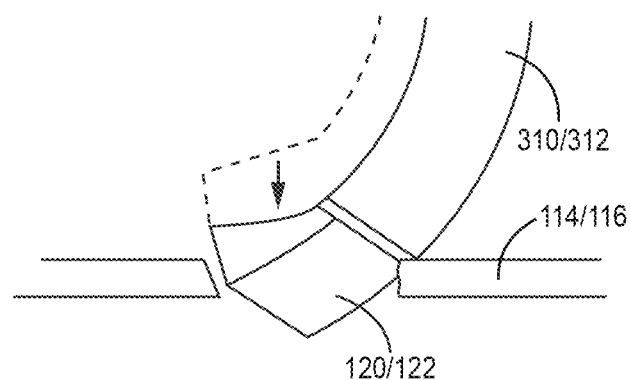

FIGS. 3A and 3B show an alternate water scoop actuation mechanism 250 for extending and/or retracting either of the water scoops 120, 122. In this embodiment, for example, the water scoops 120, 122 can optionally be integrally formed with the respective scoop tubes 310, 312. In such an embodiment, water scoop actuation mechanism 250 may operate to raise and/or lower the scoops and tubes together. In embodiments of this nature, the water scoops may be extended and retracted by linear motion, rather than employing a pivoting motion of the scoops.

In the embodiments depicted in FIGS. 2A-3B, it may be desirable for the water scoops 120, 122 to move from a retracted position to an extended position, or from an extended position to a retracted position, within some predefined period of time. The speed of actuation may depend on the particular motive force (e.g., hydraulic, pneumatic, electric, etc.) used by the water scoop actuation mechanism 200 or 250 to move the water scoops 120, 122. In some embodiments, it may be desirable for the water scoops 120, 122 to be configured to move from a retracted position to an extended position in less than about 5 seconds; in some embodiments, it may be desirable for the water scoops 120, 122 to move from a retracted position to an extended position in less than about 2 seconds, and in some cases, to do so in about 1 second. Similarly, in some embodiments, it may be desirable for the water scoops 120, 122 to be configured to move from an extended position to a retracted position in approximately the same (e.g., substantially the same, or the same) amount of time as it takes to move from a retracted position to an extended position (e.g., less than about 5 seconds, or less than about 2 seconds, or about 1 second). However, in certain embodiments, it may be desirable for the water scoops 120, 122 to be configured to move from an extended position to a retracted position more quickly (e.g., in less time) than it moves from a retracted position to an extended position. For example, in a situation where an asymmetric deployment condition of the water scoops 120, 122 has been detected (as will be described below in greater detail), it may be desirable to resolve the condition expeditiously. This may be accomplished in some embodiments by configuring the water scoop actuation mechanism 200 or 250 to apply a greater actuation force (and/or create a faster actuation speed, and/or greater acceleration), in such circumstances.

A scoop management system for deploying/extending and retracting the water scoops 120, 122 from and into the respective floats 114, 116 may be used in the firefighting float plane 10. In some embodiments, the scoop management system may be activated by a pilot or another operator of the firefighting float plane 10. A potential situation could occur where the water scoops 120, 122 do not deploy symmetrically. For example, one or both water scoops may not fully deploy or may not deploy at all, or one or both of the water scoops may deploy or retract partially and/or "asymmetrically." It would be desirable to prevent or manage any situation where the water scoops do not deploy symmetrically. It would also be desirable to eliminate concern or perception that asymmetrical water scoop deployment or retraction may occur. As set forth herein, it would be desirable to provide a firefighting float plane 10 having a scoop management system for scooping water that can be used to fill a water tank 300 on the firefighting float plane 10, while being able to detect and/or help avoid, prevent, and/or mitigate asymmetric deployment and/or retraction of the water scoops 120, 122.

Figure 4:
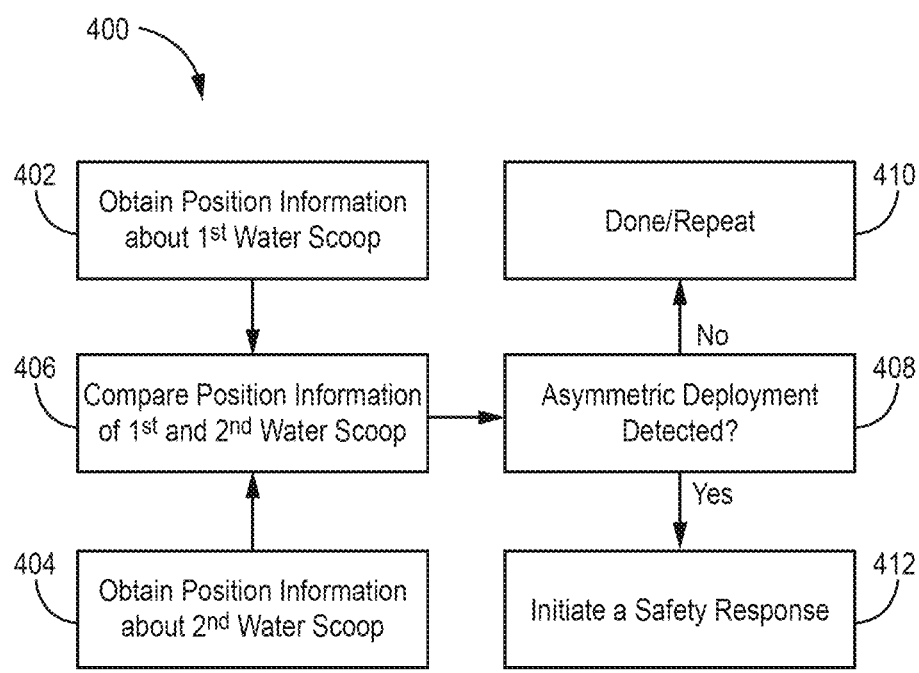
FIG. 4 is a flow chart describing operation of a scoop management system for a firefighting float plane in accordance with some embodiments of the present disclosure.

FIG. 4 is a flow chart that describes operation of a scoop management system or active scoop management system 400 at a high level. In its most basic form, scoop management system 400 is configured to detect an asymmetrical deployment situation, as shown at step 408, and in response to detecting an asymmetrical deployment situation, system 400 is configured to initiate a safety response movement of one or both of the first and second water scoops 120, 122, as indicated at step 412. The safety response movement of one or both water scoops may be performed to address the asymmetrical deployment situation. As shown in FIG. 4, scoop management system 400 may also include the steps of obtaining position information about the first water scoop 120 (step 402), obtaining position information about the second water scoop 122 (step 404), and comparing the position information about the first water scoop 120 to the position information about the second water scoop 122 (step 406). Accordingly, the comparison of position information for both water scoops 120 and 122 performed in step 406 may be an input to the step of detecting an asymmetrical deployment situation (step 408). For example, step 406 may yield information indicative of a difference in the position (or speed, or acceleration, etc.) of the two water scoops, and step 408 may make the determination of an asymmetrical deployment situation based on the difference in position (or speed, or acceleration, etc.) being greater than some predetermined threshold value. For example, if the difference is less than the predetermined threshold, the output of step 408 is "No" at step 410 (e.g., no asymmetry detected), and if the difference is greater than or equal to the predetermined threshold, then the output of step 408 is "Yes" and the system 400 proceeds to step 412 and initiates the safety response movement of one or both water scoops.

It should be noted that "position information," as used above, may also refer to information derived from and/or calculated from position information, for example velocity and/or acceleration information. Further, comparing the position information of the water scoops 120 and 122 in step 406 may comprise comparing any combination of their positions, their velocities, and/or their accelerations, since a difference between any of these position-related parameters could be indicative of (or possibly predictive of) an asymmetrical deployment situation.

Scoop management system 400 may be configured to perform steps 402 through 410/412 on a continuous basis, or on a periodic basis, according to various embodiments. In some embodiments, for example, system 400 may be turned "Off" (or not active) if there is no expectation that water scooping operations will take place. When activated, system 400 may either periodically or continuously perform steps 402 through 410/412 in anticipation of a water scooping operation. In some embodiments, system 400 may be kept "On" even during normal flight operations, with a possible benefit of detecting a potential issue before it becomes necessary to deploy the water scoops. In some embodiments, steps 402 and 404 may be performed substantially simultaneously or synchronously, or performed based upon information obtained substantially simultaneously or synchronously. For example, the comparison of position information about the first and second water scoops 120, 122 performed at step 406 may largely depend on an assumption that the position information was obtained at, or corresponds to, the same points in time for the two water scoops 120, 122.

In some embodiments, the scoop management system 400 may be configured to detect an asymmetrical deployment situation by sensing whether one of the first and second water scoops 120, 122 is in the extended position while the other is in the retracted position. Such an embodiment may, for example, enable a simplification of the nature of (and/or the technology of) the position sensing needed; in such an embodiment, for example, it may suffice to use an ON/OFF position switch to indicate either a fully extended or a fully retracted position of the water scoops. The scoop management system 400 may also be configured to detect an asymmetrical deployment situation by sensing whether one of the first and second water scoops 120, 122 is in the extended position while the other water scoop is somewhere between the extended position and the retracted position. In some embodiments, scoop management system 400 may be configured to detect an asymmetrical deployment situation by sensing that at least one of the first and second water scoops 120, 122 is neither in the extended position nor in the retracted position (e.g., is in an intermediate position) for a period of time exceeding a threshold time. In such an embodiment, an asymmetrical deployment situation would be detected if it took longer than expected for one of the first and second water scoops 120, 122 to move from a retracted position to an extended position, or from an extended position to a retracted position. A threshold time of 5 seconds, for example, may be suitable for detecting an asymmetrical deployment situation in such embodiments, although the particular threshold time used may be varied to suit the circumstances as desired. In some embodiments, any of the above-described conditions may result in the detection of an asymmetrical deployment situation.

In some embodiments, the scoop management system 400 may be configured to detect an asymmetrical deployment situation by sensing whether one of the first and second water scoops 120, 122 is moving toward the extended position faster than the other. In such embodiments, the speed of motion of the first and second water scoops 120, 122 may be measured at steps 402 and 404, or it may be derived from position information of the first and second water scoops 120, 122 (e.g., the first derivative of the position signals as a function of time). The speed information for the water scoops (being a form of position information) is compared at step 406, and the detection of an asymmetrical deployment situation is performed at step 408, for example, based upon the difference in speeds being greater than some predetermined threshold value. Similarly, in some embodiments, the scoop management system 400 is configured to detect an asymmetrical deployment situation by sensing whether one of the first and second water scoops 120, 122 is moving toward the retracted position faster than the other using an analogous process. In some embodiments, either of the above-described conditions may result in the detection of an asymmetrical deployment situation.

In various embodiments, a firefighting float plane 10 may include one or more sensors configured to produce the position information (and/or generate signals corresponding to the position information, including velocity or acceleration information, etc.) for each of the water scoops 120, 122. First float 114 and second float 116, for example, may each include one or more position sensors disposed near or along a length of an actuator used to move the water scoops 120, 122. With reference to FIG. 5, an actuator 204 (which could be a hydraulic, pneumatic, electric, or some other actuation mechanism) and/or an associated linkage 206 may be disposed adjacent to a position sensor 220A/B to generate a signal indicative of the position of the associated water scoop. (The "A/B" designation is used to distinguish between a first sensor 220A associated with a first water scoop 120, and a second sensor 220B associated with a second water scoop 122; a similar convention is applied to other aspects of the sensing technology.) In some cases, this might involve the use of a corresponding sensed element or "marker" 222A/B disposed on the actuator 204 or the linkage 206, which marker is sensed by the position sensor 220A/B, depending on the position sensing technology used. As one non-limiting example, a magnetic marker 222A/B could be formed with or coupled to a piston 208 in actuator 204, and the relative positioning between the marker 222A/B and the position sensor 220A/B would be the basis for generating the position information associated with the respective water scoops 120, 122. This can be referred to as an "indirect" position information signal, since the position of the actuator 204 or the linkage 206 (or the marker 222 on the piston 208, in some embodiments) would serve as a proxy for the actual position of the associated water scoop.

Alternatively, or additionally, a position sensor 220A/B may be disposed adjacent to, or proximate to, some portion of the water scoop 120/122 itself in order to provide a "direct" indication of the position (or velocity or acceleration, etc.) of the associated water scoop. For example, a position sensor 220A/B may be disposed on the associated scoop tube 310, 312, and a corresponding marker 222A/B may be disposed on a portion of the water scoop 120/122 (as shown in FIG. 5) such that the relative position and relative movement between the markers 222A/B and the position sensors 220A/B provides position information (and velocity and/or acceleration information) associated with the respective water scoop. Alternatively, or additionally, a position sensor 220A/B may be disposed on a portion of the float 114/116 (e.g., a lower portion of the float, such as the keel 115/117 near the opening 130, as shown in FIG. 5), and a corresponding marker 222A/B may be disposed on a portion of the water scoop 120/122 such that the relative position and relative movement between the marker 222A/B and the position sensor 220A/B provides position information (and/or information regarding velocity, acceleration, etc.) associated with the respective water scoop. Position sensors 220A/B and/or markers 222A/B used in this manner may accordingly be configured to directly sense positioning and/or velocity and/or acceleration of the first and second water scoops 120, 122 in some embodiments. Thus, one group of embodiments provides direct determination of the water scoop position information.

With continued reference to FIG. 5, the relative position of a position sensor 220A/B with respect to a corresponding marker 222A/B may result in an output signal indicative of the position of the associated water scoop 120/122. For example, a voltage may be generated that indicates a position of marker 222A/B relative to position sensor 220A/B, e.g., as a piston 208 in actuator 204 moves to either extend or retract the associated water scoop 120/122. In certain implementations, a setting may be determined to define or calibrate the sensor output signals that correspond to "known" or observed positions of retracted and extended water scoops. For example, when a water scoop 120/122 is known to be in a retracted position (e.g., by visual confirmation during installation or subsequent maintenance), a particular sensor output signal value can be measured, saved, and later used during operation for sensing whether the water scoop is in the retracted position. A similar process could be followed to identify the particular sensor output signal that corresponds to the water scoop being in the extended position (e.g., using visual confirmation of the position). The use of sensor output signals to indicate the position of the associated water scoop 120/122 in this manner could be applied to intermediate positions as well, including using such signals to determine speed of travel, or to compare the movement of the two scoops relative to each other, for example.

FIG. 6 shows an enlarged cross-sectional side view of an exemplary actuator or actuation mechanism 204, showing a possible location for a position marker 222A/B in accordance with some embodiments. For example, position marker 222A/B could be a magnet disposed on or embedded in a portion of piston 208, as shown. As shown in FIG. 6, piston 208 is fully inserted within actuator 204, which may correspond to the associated water scoop 120/122 being positioned in the extended position (see FIG. 2B, for example). When the water scoop 120/122 is commanded to its retracted position, piston 208 would move (to the right in FIG. 2B) to thereby position the water scoop 120/122 in the retracted position (see FIG. 2A, for example). As the exemplary magnet of marker 222A/B moves with piston 208, its position may be measured and/or determined via position sensor 220A/B. Sensor 220A/B may be able to sense the position and motion of marker 222A/B based on the changing position and speed of the magnetic field associated with the magnet of marker 222A/B of FIG. 6.

Various technologies can be used for sensing the position, velocity, and/or acceleration of the water scoops 120, 122. For example, magnetic sensors, Hall effect sensors, optical sensors, electro-mechanical sensors, accelerometers, and other technologies may be used for the position sensor 220A/B and/or the marker element 222A/B. A specific choice of technology for position sensing may be the result of making trade-offs between desired accuracy, speed, cost, reliability, case of maintenance, water resistance, and other similar design factors. For example, speed (e.g., speed of sensing the water scoop positions and/or speed of processing such position signals) may be one priority in some embodiments to enable the scoop management system 400 to detect an asymmetrical deployment situation quickly enough to provide an advantageous timely response.

As noted above with respect to FIGS. 2A-3B, a firefighting float plane 10 may have a first float 114 equipped with a first actuator 204 configured to move the first water scoop 120 between the retracted and extended positions, and firefighting float plane 10 may have a second float 116 equipped with a second actuator 204 configured to move the second water scoop 122 between the retracted and extended positions. In some embodiments, the first and second actuators 204 may comprise two actuators (e.g., a separate actuator 204 associated with each water scoop). In certain embodiments of this nature, the first float 114 may have a first compartment 140 (shown in FIG. 1) disposed therein. The first compartment 140, for example, may house the first water scoop 120, the first actuator 204, and the first position sensor 220 (and/or a first marker 222). Similarly, in some embodiments, the second float 116 may have a second compartment 142 (shown in FIG. 1) disposed therein. The second compartment 142, for example, may house the second water scoop 122, the second actuator 204, and the second position sensor 220 (and/or a second marker 222).

In some alternate embodiments, a single actuator 204 may be used to move both water scoops 120, 122, for example, using appropriate linkages.

In some embodiments, the first float 114 may have a first keel 115 disposed at a lower portion of first float 114, and the second float 116 may have a second keel 117 disposed at a lower portion of second float 116, as depicted generally in FIG. 5. In such an embodiment, the first water scoop 120 may, for example, be retracted inside the first float 114 when the first water scoop 120 is in the retracted position so as to be above the first keel 115 (see FIG. 2A). In this embodiment, when the first water scoop 120 is in the extended position, it may project downwardly below the first keel 115 (as shown in FIG. 5 and in FIG. 2B). Likewise, the second water scoop 122 may be retracted inside the second float 116 when the second water scoop 122 is in the retracted position so as to be above the second keel 117 (see FIG. 2A). In this embodiment, when the second water scoop 122 is in the extended position, it may project downwardly below the second keel 117 (as shown in FIG. 5 and in FIG. 2B).

Figure 7:
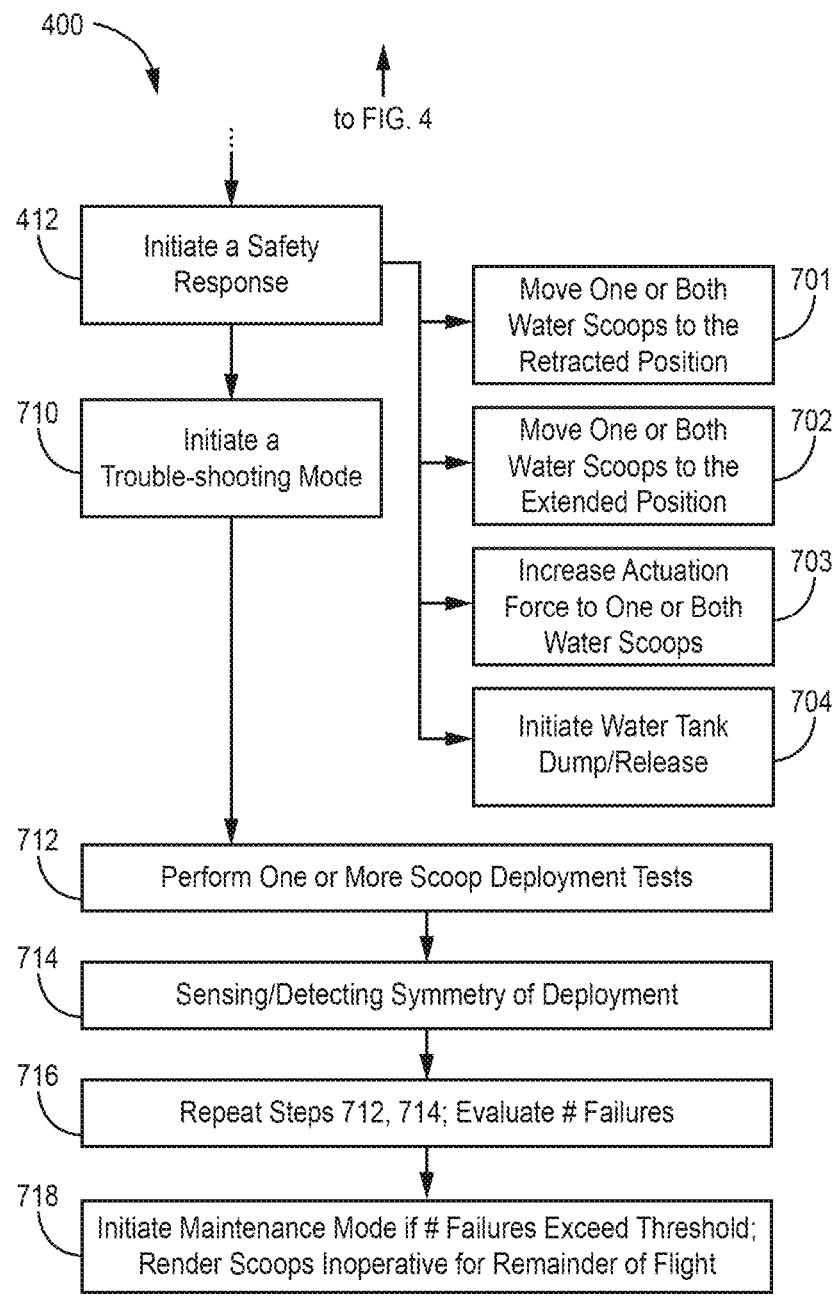
FIG. 7 is a flow chart describing operation of a scoop management system for a firefighting float plane in accordance with some embodiments of the present disclosure.

FIG. 7 shows a flow chart (and/or a portion or a continuation of the flow chart of FIG. 4) that provides some optional and/or additional steps and details regarding operation of scoop management system 400 following the detection of an asymmetrical deployment situation. For example, scoop management system 400 may, in conjunction with initiating the safety response movement at step 412, move one or both of the first and second water scoops 120, 122 to the retracted position at step 701. Alternately, scoop management system 400 may, in conjunction with initiating the safety response movement at step 412, move one or both of the first and second water scoops 120, 122 to the extended position at step 702. In some embodiments, scoop management system 400 may first attempt to perform step 701 (e.g., move both water scoops 120, 122 to the retracted position). However, in a situation where the system 400 is unable to complete step 701, for example, the system 400 may then perform step 702 and move both water scoops 120, 122 to the extended position. This may result in a symmetrical scoop deployment situation, which may be preferable to having an asymmetrical scoop deployment situation resulting from an inability to complete step 701, for example. Alternatively, the order could be reversed and step 702 could be performed before step 701.

In some embodiments, scoop management system 400 may, following performance of the safety response movement at step 412, initiate a troubleshooting mode, as shown at step 710 in FIG. 7. The troubleshooting mode 710 may allow a pilot (or other operator) of the firefighting float plane 10 to run one or more deployment tests 712 (e.g., water scoop deployment tests) while the float plane 10 remains in flight. For example, the one or more deployment tests 712 may comprise giving a command to move the first and second water scoops 120, 122 from the retracted position to the extended position. The troubleshooting mode 710 may further comprise, following performance of the one or more deployment tests 712, sensing whether both water scoops move symmetrically to the extended position in response to the command at step 714.

In some embodiments, troubleshooting mode 710 of scoop management system 400 may further comprise repeating steps 712 and 714 a certain number of times, and if a failure of step 714 (e.g., water scoops 120, 122 fail to move symmetrically) occurs more than a predetermined number of times, scoop management system 400 may initiate a maintenance mode 718. In some cases, maintenance mode 718 may involve rendering and/or maintaining water scoops 120, 122 inoperative for the duration of the flight. In such cases, water scoops 120, 122 may be maintained inoperative in the retracted position for the duration of the flight.

With continued reference to FIG. 7, step 412 may comprise additional and/or alternative steps of a safety response movement. For example, scoop management system 400 may, in conjunction with initiating the safety response movement at step 412, increase the actuation force acting on either the first water scoop 120 or the second water scoop 122, or possibly both, at step 703. Alternatively, scoop management system 400 may, in conjunction with initiating the safety response movement at step 412, move one or both of the first and second water scoops 120, 122 to the retracted position and release the contents of the water tank 300 (e.g., by initiating a water tank dump) at step 704. In some embodiments, initiating the dump of the water tank 300 may comprise scoop management system 400 prompting the pilot (or other operator) to activate or initiate the water tank dump; the prompt could be an audible and/or visible alarm indicating the water tank dump as a recommended course of action. In other embodiments, initiating the dump of the water tank 300 may comprise scoop management system 400 automatically activating the water tank dump without operator intervention.

Figure 8:
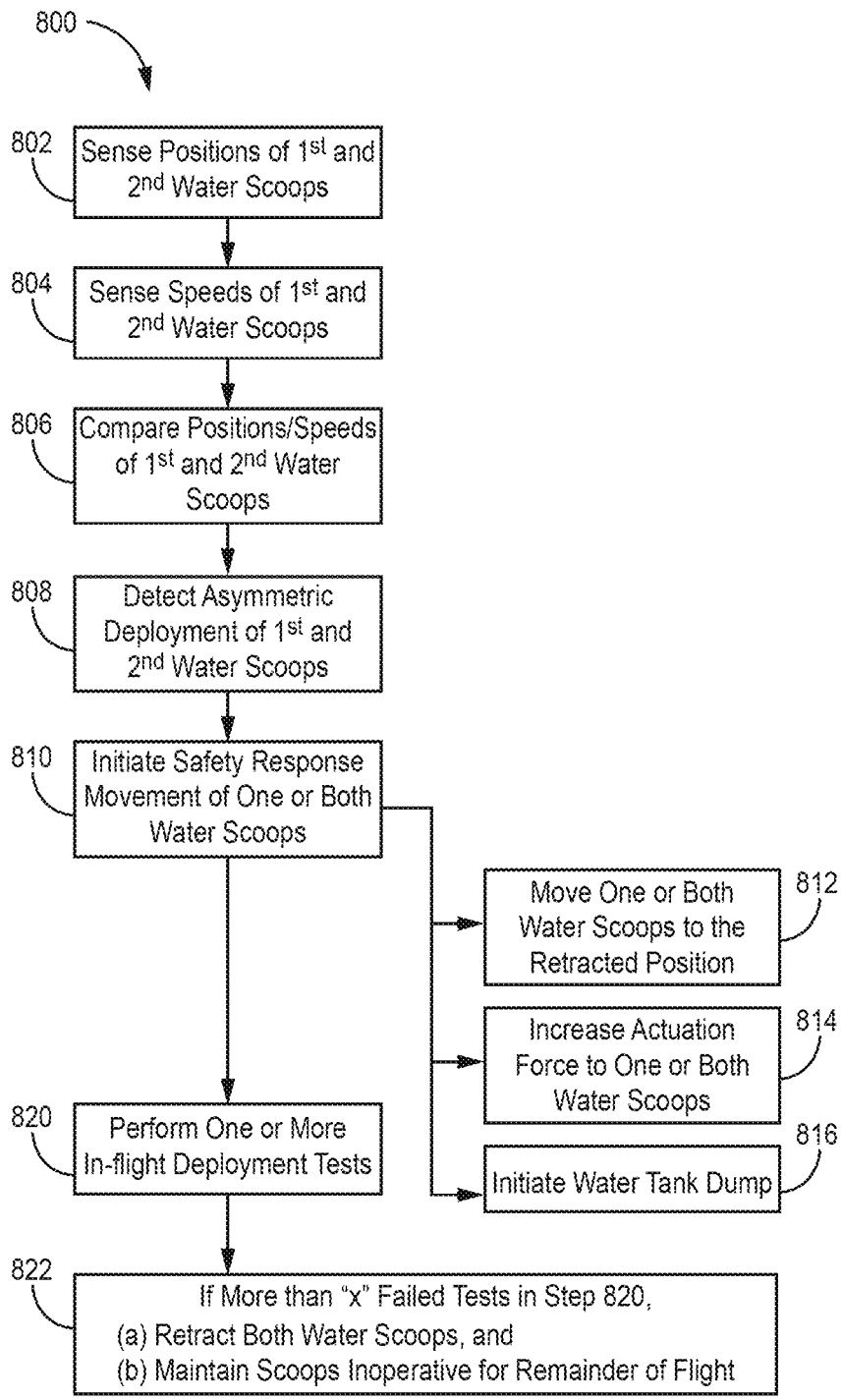
FIG. 8 is a flow chart describing a method of operating a water scoop system for a firefighting float plane in accordance with some embodiments of the present disclosure.

This disclosure also describes methods of operating a pair of water scoops and/or a water scoop system for a firefighting float plane 10. Referring back to FIG. 1, a firefighting float plane 10 that may be used in accordance with method 800 may comprise a fuselage 112, at least one wing (e.g., two wings) 110, a water tank structure (e.g., water tank 300), and first and second floats 114 and 116. The water scoop system of the firefighting float plane 10 may comprise a first water scoop 120 associated with the first float 114, and a second water scoop 122 associated with the second float 116. Each of the first and second water scoops 120, 122 is movable between a retracted position and an extended position. With reference to FIG. 8, a method of operating a pair of water scoops and/or a water scoop system for a firefighting float plane 10 may comprise detecting an asymmetric deployment condition of the first and second water scoops 120, 122 (step 808), and in response to detecting the asymmetric deployment condition, initiating a safety response movement of one or both of the first and second water scoops 120, 122 (step 810).

In some embodiments, method 800 may include the step of sensing a first water scoop position and a second water scoop position at step 802. Step 802 may be performed prior to detecting the asymmetric deployment condition of the first and second water scoops in step 808. In some embodiments, method 800 may include the alternate or additional step of sensing a first water scoop velocity and a second water scoop velocity at step 804. Step 804 may be performed prior to detecting the asymmetric deployment condition of the first and second water scoops in step 808.

In some embodiments, method 800 may include the alternate or additional steps of (a) receiving a signal from a first sensor 220A indicating a first water scoop 120 position and/or velocity; (b) receiving a signal from a second sensor 220B indicating a second water scoop 122 position and/or velocity; and (c) comparing the signal received from the first sensor 220A to the signal from the second sensor 220B (step 806). Step 806 may be performed prior to detecting the asymmetric deployment condition of the first and second water scoops in step 808.

In some embodiments, step 810 (e.g., initiating the safety response movement) of method 800 may include the alternate or additional steps and/or details of moving one or both of the first and second water scoops 120, 122 to the retracted position (step 812). In some embodiments, step 810 (e.g., initiating the safety response movement) of method 800 may include the alternate or additional steps and/or details of increasing an actuation force applied to either the first water scoop 120 or the second water scoop 122 (step 814). In some embodiments, step 810 (e.g., initiating the safety response movement) of method 800 may include the alternate or additional steps and/or details of moving one or both of the first and second water scoops 120, 122 to the retracted position and initiating a dump (e.g., a release of the contents) of the water tank 300 (step 816).

In some embodiments, method 800 may further include, following the safety response movement (step 810), performing one or more in-flight deployment tests (step 820). The one or more in-flight deployment tests of step 820 may comprise, for example, (a) commanding the first and second water scoops 120, 122 to move from the retracted position to the extended position; and (b) determining whether the first and second water scoops 120, 122 move from the retracted position to the extended position in a symmetric manner. In some embodiments, the one or more in-flight deployment tests of step 820 may be initiated by a command from a user interface in the firefighting float plane.

In some embodiments, method 800 may further comprise, in response to determining that the first and second water scoops 120, 122 fail to move from the retracted position to the extended position in a symmetric manner (e.g., during the in-flight deployment test of step 820) a predetermined number of times, performing step 822, which may include (a) moving the first and second water scoops 120, 122 to the retracted position; and (b) maintaining the first and second water scoops 120, 122 inoperative in the retracted position for a remaining duration of a flight.

Figure 9:
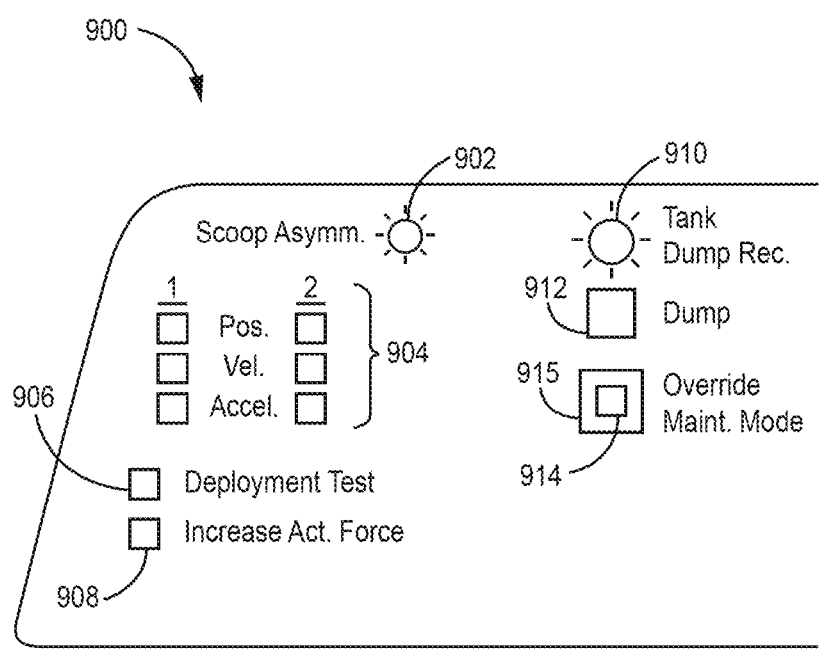
FIG. 9 is a front panel view showing portions of a dashboard of a firefighting float plane in accordance with some embodiments of the present disclosure.

FIG. 9 is front panel view showing portions of a dashboard 900 of a firefighting float plane 10 in accordance with some embodiments of the present disclosure. A dashboard 900 may, for example, include any or all of the features described with respect to FIG. 9, and additional features that would be apparent to those of ordinary skill in the art with the benefit of these teachings. An indication of water scoop deployment asymmetry 902 may be provided on dashboard 900 in some aspects. Indication 902 may comprise a light, LED, LCD, audible alarm, and other forms of indicators suitable for informing a pilot or other operator of the scoop deployment asymmetry condition. One or more additional indications 904 may also be included, for example, to provide more details about the nature of the scoop deployment asymmetry. For example, in the particular embodiment depicted in FIG. 9, an operator could be informed of whether the asymmetry detected is based upon a difference in position, velocity, and/or acceleration of the first and second water scoops 120, 122. There are separate indications of position, velocity, and acceleration provided for each of the first and second water scoops as shown in this example; it may be possible, for example, to indicate which of the two water scoops may be operating unusually or abnormally based on the information provided by position sensors, and an indicator reflecting this information may be useful to an operator in troubleshooting the condition. It should be noted that, in certain embodiments (e.g., on dashboards 900 of some firefighting float plane models, not shown), a single indicator light may be used for both scoops, for example, to indicate "Scoops UP" or "Scoops DOWN." In such cases, a logic circuit may be used with the embodiments described herein to provide similar indications to an operator. For example, the position sensors corresponding to each of the water scoops 120, 122 can be used with "AND" logic to actuate the same "Scoops UP" and "Scoops DOWN" indicator lights only if both sensors meet the defined criteria. The dashboard 900 may also include buttons 906 and 908 for use by a pilot/operator upon detection of an asymmetric scoop deployment condition. For example, button 906 may enable an operator to enter a command to extend and/or retract the water scoops 120, 122 during flight to check the symmetry of deployment and/or retraction. Button 908 (or buttons 908, in some embodiments) may be employed by a pilot or an operator to increase the actuation force applied to one or both water scoops 120, 122 in order to either fully extend or fully retract both of the water scoops. Additionally or alternatively, dashboard 900 may include a prompt 910 to recommend an emergency dump of the water tank 300 to a pilot/operator. In some embodiments, a water tank dump may be performed automatically, in which case, the prompt 910 may only be informational to alert the pilot/operator of the action being taken. Alternatively, some embodiments may prompt the pilot/operator to initiate the recommended water tank dump via prompt 910 (e.g., audible and/or visible alarm indications), but the water tank dump must be initiated by the operator, for example via button 912 in the embodiment depicted.

As noted above, an indication of water scoop deployment asymmetry 902 may comprise a light, LED, LCD, audible alarm, and other forms of indicators. In certain embodiments, it may be desirable to configure indication 902 (e.g., a lighted status indicator) to turn on (e.g., light actuated) upon detection of the asymmetric deployment condition, and to subsequently clear the alarm (e.g., turn off the lighted indication 902) when the asymmetric condition resolves. Alternatively, it may be desirable to configure indication 902 (e.g., a lighted status indicator) to turn on (e.g., actuate light) upon detection of the asymmetric deployment condition, and to subsequently require an operator to manually clear or reset the alarm condition. This may be referred to as a "latched" alarm, and it may be desirable to require a manual reset for various reasons (e.g., to investigate the root cause of a "temporary" alarm condition in an effort to avoid a later, possibly "more substantial" alarm condition). A requirement of manual clearing or resetting of a "latched" alarm may also function as an interlock, for example, to prevent certain other actions unless and until the manual reset occurs. In embodiments where multiple forms of indicators are used (e.g., a lighted indicator and an audible alarm), it may be desirable to enable the clearing or silencing of one alarm (e.g., the audible alarm), while maintaining the other in a "latched" alarm mode (e.g., the lighted indicator) until manually reset. Other variations are contemplated and would become apparent to those of ordinary skill in the art with the benefit of these teachings.

In embodiments where a "Maintenance Mode" is entered after failure of a specified number of deployment tests (e.g., thereby rendering the scoops inoperable in the retracted position), it may be desirable to offer an override button 914 to allow a pilot/operator to continue water scooping operations despite being placed in the Maintenance Mode. In such an event, it may be desirable or preferable to require an operator to specifically acknowledge this by having a cover 915 placed over the override button 914. In some embodiments, use of the override (either or both of button 914 and cover 915) may be logged in a system for later information retrieval.

In some further embodiments, monitoring of parameters related to the positions (e.g., position, speed, acceleration) of one or both water scoops 120, 122 may be used in a diagnostic manner. That is, there may be cases where the water scoops 120, 122 are properly deployed and used without any alarms indicative of an asymmetric deployment condition, yet certain measured parameters (e.g., scoop position sensor information, or information derived from such position information) may be useful to indicate or predict the potential for a future asymmetrical deployment situation. Diagnostic use of position-related data from the water scoops may suggest or prompt preventive maintenance, repair, or inspection upon completion of the current operation, in some cases. For example, if one water scoop moved more slowly than the other during extension or retraction, it could indicate a number of possible issues (a need for lubrication, or a worn bearing, or an obstruction, etc.) on the side of the affected water scoop. Thus, although detecting an asymmetric deployment condition as it occurs in operation may be helpful, it would be preferable to avoid an asymmetric deployment condition altogether, such as by using position-related information in a diagnostic manner, as described above.

EMBODIMENTS

1. A firefighting float plane comprising a fuselage, a wing, a water tank structure, first and second floats, first and second water scoops, and an active scoop management system, the first and second floats equipped respectively with the first and second water scoops, each of the first and second water scoops having a retracted position and an extended position, the active scoop management system configured to: (i) detect an asymmetrical deployment situation of the first and second water scoops, and in response thereto (ii) initiate a safety response movement of one or both of the first and second water scoops to address the asymmetrical deployment situation.

2. The firefighting float plane of embodiment 1 wherein the active scoop management system is configured to detect the asymmetrical deployment situation by sensing whether: (a) one of the first and second water scoops is in the extended position while the other is in the retracted position, or (b) one of the first and second water scoops is in the extended position while the other is between the extended position and the retracted position.

3. The firefighting float plane of any preceding embodiment wherein the active scoop management system is configured to detect the asymmetrical deployment situation by sensing whether: (a) one of the first and second water scoops is moving toward the extended position faster than the other, or (b) one of the first and second water scoops is moving toward the retracted position faster than the other.

4. The firefighting float plane of any preceding embodiment wherein the first float is equipped with a first sensor configured to determine positioning and/or velocity of the first water scoop, and the second float is equipped with a second sensor configured to determine positioning and/or velocity of the second water scoop.

5. The firefighting float plane of any preceding embodiment wherein the first and second floats are equipped with first and second sensors operatively coupled respectively with the first and second water scoops, the first sensor configured to directly sense positioning and/or velocity of the first water scoop, the second sensor configured to directly sense positioning and/or velocity of the second water scoop.

6. The firefighting float plane of any preceding embodiment wherein the first float is equipped with a first actuator configured to move the first water scoop between the retracted and extended positions, and the second float is equipped with a second actuator configured to move the second water scoop between the retracted and extended positions.

7. The firefighting float plane of embodiment 6 wherein the first float has a first compartment in which the first water scoop, the first actuator, and the first sensor are disposed, and the second float has a second compartment in which the second water scoop, the second actuator, and the second sensor are disposed.

8. The firefighting float plane of any preceding embodiment wherein each of the first and second water scoops is configured to pivot in moving between the retracted and extended positions.

9. The firefighting float plane of any preceding embodiment wherein the first float has a first keel, the second float has a second keel, the first water scoop when in the retracted position is retracted inside the first float so as to be above the first keel, the first water scoop when in the extended position projects downwardly below the first keel, the second water scoop when in the retracted position is retracted inside the second float so as to be above the second keel, and the second water scoop when in the extended position projects downwardly below the second keel.

10. The firefighting float plane of any preceding embodiment wherein the active scoop management system is configured to initiate the safety response movement by moving one or both of the first and second water scoops to the retracted position.

11. The firefighting float plane of embodiment 1 wherein the active scoop management system is configured to initiate the safety response movement by moving one or both of the first and second water scoops to the extended position.

12. The firefighting float plane of embodiment 10 wherein following the safety response movement the active scoop management system is configured to initiate a troubleshooting mode that allows a pilot of the firefighting float plane to run one or more deployment tests while in flight, the one or more deployment tests comprising giving a command to move the first and second water scoops from the retracted position to the extended position and sensing whether both water scoops move symmetrically to the extended position in response to the command.

13. The firefighting float plane of embodiment 12 wherein the active scoop management system is configured such that if a predetermined number of the one or more deployment tests fail, the active scoop management system initiates a maintenance mode in which both water scoops are maintained inoperative in the retracted position for a duration of the flight.

14. The firefighting float plane of embodiment 1 wherein the active scoop management system is configured to initiate the safety response movement by increasing an actuation force on either the first water scoop or the second water scoop.

15. The firefighting float plane of embodiment 1 wherein the active scoop management system is configured to initiate the safety response movement by moving one or both of the first and second water scoops to the retracted position and initiating a water tank dump.

16. The firefighting float plane of embodiment 1 wherein the active scoop management system is configured to initiate the safety response movement by moving one or both of the first and second water scoops to the retracted position and prompting an operator to initiate a water tank dump.

17. The firefighting float plane of any preceding embodiment wherein the first and second water scoops are in fluid communication with the water tank structure through tubing that extends from the first and second water scoops, through the first and second floats, and to the water tank structure.

18. The firefighting float plane of any preceding embodiment wherein the active scoop management system is configured to detect the asymmetrical deployment situation by sensing that at least one of the first and second water scoops is neither in the extended position nor in the retracted position for a period of time exceeding a threshold time.

19. A method of operating a water scoop system for a firefighting float plane, the firefighting float plane comprising a fuselage, a wing, a water tank structure, and first and second floats, the water scoop system comprising a first water scoop associated with the first float and a second water scoop associated with the second float, each of the first and second water scoops being movable between a retracted position and an extended position, the method comprising: (a) detecting an asymmetric deployment condition of the first and second water scoops, and (b) in response to detecting the asymmetric deployment condition, initiating a safety response movement of one or both of the first and second water scoops.

20. The method of embodiment 19 wherein detecting the asymmetric deployment condition of the first and second water scoops comprises sensing a first water scoop position and a second water scoop position.

21. The method of any preceding embodiment wherein detecting the asymmetric deployment condition of the first and second water scoops comprises sensing a first water scoop velocity and a second water scoop velocity.

22. The method of embodiment 19 wherein detecting the asymmetric deployment condition of the first and second water scoops comprises: (a) receiving a signal from a first sensor indicating a first water scoop position and/or velocity; (b) receiving a signal from a second sensor indicating a second water scoop position and/or velocity; and (c) comparing the signal from the first sensor to the signal from the second sensor.

23. The method of any preceding embodiment wherein one or more of the first sensor and the second sensor comprises a magnetic sensor.

24. The method of any preceding embodiment wherein one or more of the first sensor and the second sensor comprises a Hall effect sensor.

25. The method of any preceding embodiment wherein initiating the safety response movement comprises moving one or both of the first and second water scoops to the retracted position.

26. The method of embodiment 25 further comprising, following the safety response movement, performing one or more in-flight deployment tests, the one or more in-flight deployment tests comprising: (a) commanding the first and second water scoops to move from the retracted position to the extended position; and (b) determining whether the first and second water scoops move from the retracted position to the extended position in a symmetric manner.

27. The method of embodiment 26 wherein the one or more in-flight deployment tests are initiated by a command from a user interface in the firefighting float plane.

28. The method of embodiments 26 or 27, further comprising, in response to determining that the first and second water scoops fail to move from the retracted position to the extended position in a symmetric manner a predetermined number of times, (a) moving the first and second water scoops to the retracted position; and (b) maintaining the first and second water scoops inoperative in the retracted position for a remaining duration of a flight.

29. The method of embodiment 1 wherein initiating the safety response movement comprises increasing an actuation force applied to either the first water scoop or the second water scoop.

30. The method of embodiment 1 wherein initiating the safety response movement comprises moving one or both of the first and second water scoops to the retracted position and initiating a water tank dump.

Thus, various embodiments of a firefighting float plane 10 and methods of operating a water scoop system for such a plane are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A firefighting float plane comprising a fuselage, a wing, a water tank structure, first and second floats, first and second water scoops, and an active scoop management system, the first and second floats mounted to the fuselage by a mount structure such that they are spaced below and laterally offset from the fuselage, the water tank structure comprising a water tank disposed within the fuselage, the first and second floats equipped respectively with the first and second water scoops, each of the first and second water scoops having a retracted position and an extended position, the water scoops when in the extended position being configured to scoop water from a body of water while the firefighting float plane flies along a surface of the body of water with the first and second floats skimming the surface of the body of water, such that scooped water is delivered via pipes or tubes from the first and second water scoops, through the first and second floats, upwardly along the mount structure and to the water tank in the fuselage, the active scoop management system comprising a first sensor and a second sensor such that the active scoop management system is configured to:

(i) sense position, velocity and/or acceleration of the first water scoop with the first sensor;

(ii) sense position, velocity and/or acceleration of the second water scoop with the second sensor;

iii) compare a signal from the first sensor reflecting the position, velocity and/or acceleration of the first water scoop to a signal received from the second sensor reflecting the position, velocity and/or acceleration of the second water scoop, thereby making a comparison of position information for the first water scoop and the second water scoop;

(iv) based on the comparison of position information for the first water scoop and the second water scoop, detect an asymmetrical deployment situation of the first and second water scoops, and in response thereto (v) initiate a safety response movement of one or both of the first and second water scoops to address the asymmetrical deployment situation.

2. The firefighting float plane of claim 1 wherein the active scoop management system is configured to detect the asymmetrical deployment situation by sensing whether: (a) one of the first and second water scoops is in the extended position while the other is in the retracted position, or (b) one of the first and second water scoops is in the extended position while the other is between the extended position and the retracted position.

3. The firefighting float plane of claim 1 wherein the active scoop management system is configured to detect the asymmetrical deployment situation by sensing whether: (a) one of the first and second water scoops is moving toward the extended position faster than the other, or (b) one of the first and second water scoops is moving toward the retracted position faster than the other.

4. The firefighting float plane of claim 1 wherein the first sensor is configured to directly sense positioning and/or velocity of the first water scoop, and the second sensor is configured to directly sense positioning and/or velocity of the second water scoop.

5. The firefighting float plane of claim 1 wherein the first float is equipped with a first actuator configured to move the first water scoop between the retracted and extended positions, and the second float is equipped with a second actuator configured to move the second water scoop between the retracted and extended positions.

6. The firefighting float plane of claim 5 wherein the first float has a first compartment in which the first water scoop, the first actuator, and the first sensor are disposed, and the second float has a second compartment in which the second water scoop, the second actuator, and the second sensor are disposed.

7. The firefighting float plane of claim 1 wherein each of the first and second water scoops is configured to pivot in moving between the retracted and extended positions.

8. The firefighting float plane of claim 1 wherein the first float has a first keel, the second float has a second keel, the first water scoop when in the retracted position is retracted inside the first float so as to be above the first keel, the first water scoop when in the extended position projects downwardly below the first keel, the second water scoop when in the retracted position is retracted inside the second float so as to be above the second keel, and the second water scoop when in the extended position projects downwardly below the second keel.

9. The firefighting float plane of claim 1 wherein the active scoop management system is configured to initiate the safety response movement by moving one or both of the first and second water scoops to the retracted position.

10. The firefighting float plane of claim 1 wherein the active scoop management system is configured to initiate the safety response movement by moving one or both of the first and second water scoops to the extended position.

11. The firefighting float plane of claim 9 wherein following the safety response movement the active scoop management system is configured to initiate a troubleshooting mode that allows a pilot of the firefighting float plane to run one or more deployment tests while in flight, the one or more deployment tests comprising giving a command to move the first and second water scoops from the retracted position to the extended position and sensing whether both water scoops move symmetrically to the extended position in response to the command.

12. The firefighting float plane of claim 11 wherein the active scoop management system is configured such that if a predetermined number of the one or more deployment tests fail, the active scoop management system initiates a maintenance mode in which both water scoops are maintained inoperative in the retracted position for a duration of the flight.

13. The firefighting float plane of claim 1 wherein the active scoop management system is configured to initiate the safety response movement by increasing an actuation force on either the first water scoop or the second water scoop.

14. The firefighting float plane of claim 1 wherein the active scoop management system is configured to initiate the safety response movement by moving one or both of the first and second water scoops to the retracted position and automatically activating a water tank dump.

15. The firefighting float plane of claim 1 wherein the active scoop management system is configured to initiate the safety response movement by moving one or both of the first and second water scoops to the retracted position and prompting an operator to initiate a water tank dump.

16. The firefighting float plane of claim 1 wherein the active scoop management system is configured to detect the asymmetrical deployment situation by sensing that at least one of the first and second water scoops is neither in the extended position nor in the retracted position for a period of time exceeding a threshold time.

17. The firefighting float plane of claim 1 wherein one or more of the first sensor and the second sensor comprises a magnetic sensor.

18. The firefighting float plane of claim 1 wherein one or more of the first sensor and the second sensor comprises a Hall effect sensor.

19. The firefighting float plane of claim 1 wherein the first and second water scoops are each configured to move from the retracted position to the extended position in less than about 2 seconds, and wherein the first and second water scoops are each configured to move from the extended position to the retracted position in less than about 2 seconds.

20. The firefighting float plane of claim 1 wherein the first and second water scoops are each provided with a water scoop actuation mechanism for extending and retracting each water scoop between the retracted position and the extended position, such that in response to detecting the asymmetric deployment condition the first and second water scoops are configured to move from the extended position to the retracted position in less time than they move from the retracted position to the extended position.

21. The firefighting float plane of claim 20 wherein the water scoop actuation mechanism is configured to create a faster actuation speed to move each water scoop from the extended position to the retracted position than to move each water scoop from the retracted position to the extended position.

22. The firefighting float plane of claim 1 wherein the firefighting float plane has a dashboard, and the dashboard includes a button that can be operated by a pilot to increase an actuation force applied to one or both of the first and second water scoops to either move from the retracted position to the extended position or to move from the extended position to the retracted position.

23. The firefighting float plane of claim 1 wherein the firefighting float plane has a dashboard, and the dashboard includes an indication of water scoop deployment asymmetry comprising a light, LED, LCD, or audible alarm, and wherein the indication of water scoop deployment asymmetry: (i) is configured to turn on upon detection of the asymmetrical deployment situation, and (ii) is a latched alarm such that the indication of water scoop deployment asymmetry does not automatically turn off when the asymmetrical deployment situation resolves but instead requires an operator to manually clear or reset an alarm condition of the latched alarm.

24. A method of operating a water scoop system for a firefighting float plane, the firefighting float plane comprising a fuselage, a wing, a water tank structure, first and second floats, and an active scoop management system, the first and second floats mounted to the fuselage by a mount structure such that they are spaced below and laterally offset from the fuselage, the water tank structure comprising a water tank disposed within the fuselage, the water scoop system comprising a first water scoop associated with the first float and a second water scoop associated with the second float, each of the first and second water scoops being movable between a retracted position and an extended position, the water scoops when in the extended position being configured to scoop water from a body of water while the firefighting float plane flies along a surface of the body of water with the first and second floats skimming the surface of the body of water, such that scooped water is delivered via pipes or tubes from the first and second water scoops, through the first and second floats, upwardly along the mount structure and to the water tank in the fuselage, wherein the method involves the active scoop management system:
 (a) sensing position, velocity and/or acceleration of the first water scoop with the first sensor;
 (b) sensing position, velocity and/or acceleration of the second water scoop with the second sensor;
 (c) comparing a signal from the first sensor reflecting the position, velocity and/or acceleration of the first water scoop to a signal received from the second sensor reflecting the position, velocity and/or acceleration of the second water scoop, thereby making a comparison of position information for the first water scoop and the second water scoop;
 (d) based on the comparison of position information for the first water scoop and the second water scoop, detecting an asymmetric deployment condition of the first and second water scoops, and
 (e) in response to detecting the asymmetric deployment condition, initiating a safety response movement of one or both of the first and second water scoops.

25. The method of claim 24 wherein initiating the safety response movement comprises moving one or both of the first and second water scoops to the retracted position.

26. The method of claim 24 wherein initiating the safety response movement comprises increasing an actuation force applied to the first water scoop, the second water scoop, or both.

27. The method of claim 24 wherein initiating the safety response movement comprises moving one or both of the first and second water scoops to the retracted position and automatically activating a water tank dump.

28. The method of claim 24 wherein the method includes moving the first and second water scoops to the extended position in less than about 2 seconds, and the method subsequently includes moving the first and second water scoops to the retracted position in less than about 2 seconds.

29. The method of claim 24 wherein the method includes moving the first and second water scoops toward the extended position, and the method subsequently includes moving the first and second water scoops toward the retracted position with greater acceleration than when they move toward the extended position.

30. A method of operating a water scoop system for a firefighting float plane, the firefighting float plane comprising a fuselage, a wing, a water tank structure, and first and second floats, the water scoop system comprising a first water scoop associated with the first float and a second water scoop associated with the second float, each of the first and second water scoops being movable between a retracted position and an extended position, the method comprising:
 (i) detecting an asymmetric deployment condition of the first and second water scoops, and
 (ii) in response to detecting the asymmetric deployment condition, initiating a safety response movement of one or both of the first and second water scoops;
wherein initiating the safety response movement comprises moving one or both of the first and second water scoops to the retracted position, and the method further comprises, following the safety response movement, performing one or more in-flight deployment tests, the one or more in-flight deployment tests comprising:
(a) commanding the first and second water scoops to move from the retracted position to the extended position; and
(b) determining whether the first and second water scoops move from the retracted position to the extended position in a symmetric manner.

31. The method of claim 30 wherein the one or more in-flight deployment tests are initiated by a command from a user interface in the firefighting float plane.

32. The method of claim 30 further comprising, in response to determining that the first and second water scoops fail to move from the retracted position to the extended position in a symmetric manner a predetermined number of times,
 (a) moving the first and second water scoops to the retracted position; and
 (b) maintaining the first and second water scoops inoperative in the retracted position for a remaining duration of a flight.

33. A method of operating a water scoop system for a firefighting float plane, the firefighting float plane comprising a fuselage, a wing, a water tank structure, and first and second floats, the water scoop system comprising a first water scoop associated with the first float and a second water scoop associated with the second float, each of the first and second water scoops being movable between a retracted position and an extended position, the method comprising:
  (a) detecting an asymmetric deployment condition of the first and second water scoops, and
  (b) in response to detecting the asymmetric deployment condition, initiating a safety response movement of one or both of the first and second water scoops;

wherein detecting the asymmetric deployment condition of the first and second water scoops comprises sensing a first water scoop velocity and a second water scoop velocity.

* * * * *